(12) United States Patent
Cornet et al.

(10) Patent No.: US 12,115,707 B2
(45) Date of Patent: Oct. 15, 2024

(54) METHOD FOR MANUFACTURING A TRANSLUCENT OR TRANSPARENT VEHICLE PART

(71) Applicant: Compagnie Plastic Omnium SE, Lyons (FR)

(72) Inventors: Olivier Cornet, Sainte-Julie (FR); Stéphane Guillier, Sainte-Julie (FR); Xavier Husak, Sainte-Julie (FR)

(73) Assignee: Compagnie Plastic Omnium SE, Lyons (FR)

( * ) Notice: Subject to any disclaimer, the term of this patent is extended or adjusted under 35 U.S.C. 154(b) by 0 days.

(21) Appl. No.: 18/071,883

(22) Filed: Nov. 30, 2022

(65) Prior Publication Data
US 2023/0166434 A1    Jun. 1, 2023

(30) Foreign Application Priority Data
Dec. 1, 2021 (FR) .................................. 2112817

(51) Int. Cl.
| | | |
|---|---|---|
| B29C 45/14 | (2006.01) | |
| B05D 3/06 | (2006.01) | |
| (Continued) | | |

(52) U.S. Cl.
CPC ........ *B29C 45/14688* (2013.01); *B05D 3/065* (2013.01); *B05D 7/58* (2013.01); *B32B 3/30* (2013.01); *B32B 27/08* (2013.01); *B32B 27/36* (2013.01); *B32B 37/24* (2013.01); *B29C 2045/14696* (2013.01); *B29C 2045/14868* (2013.01); *B29K 2995/0026* (2013.01); *B29L 2031/3005* (2013.01); *B32B 2037/243* (2013.01); *B32B 2250/24* (2013.01);
(Continued)

(58) Field of Classification Search
CPC ......................................................... B05D 7/58
See application file for complete search history.

(56) References Cited

U.S. PATENT DOCUMENTS

| | | | |
|---|---|---|---|
| 6,277,312 B1 * | 8/2001 | Hansen | ................... B44C 1/228 425/383 |
| 11,358,173 B2 | 6/2022 | Vidal et al. | |

(Continued)

FOREIGN PATENT DOCUMENTS

| | | |
|---|---|---|
| EP | 2006119 A2 | 12/2008 |
| EP | 3772380 A1 | 2/2021 |

(Continued)

OTHER PUBLICATIONS

European Search Report in EP Patent Application No. EP22210341 dated May 19, 2023.

(Continued)

*Primary Examiner* — Dah-Wei D. Yuan
*Assistant Examiner* — Kristen A Dagenais
(74) *Attorney, Agent, or Firm* — Dilworth IP, LLC

(57) ABSTRACT

A method for manufacturing a vehicle part, including the steps of applying a paint layer on a first face of a transparent or translucent part, applying a varnish layer on the paint layer, partially irradiating the paint layer and the varnish layer with laser radiation so as to etch the paint layer and the varnish layer, and overmolding a semi-transparent film on a second face of the transparent or translucent part opposite the first face.

14 Claims, 3 Drawing Sheets

(51) Int. Cl.
    *B05D 7/00*     (2006.01)
    *B32B 3/30*     (2006.01)
    *B32B 27/08*     (2006.01)
    *B32B 27/36*     (2006.01)
    *B32B 37/24*     (2006.01)
    *B29L 31/30*     (2006.01)

(52) U.S. Cl.
    CPC ....... *B32B 2255/10* (2013.01); *B32B 2255/28* (2013.01); *B32B 2307/412* (2013.01); *B32B 2307/414* (2013.01); *B32B 2307/732* (2013.01); *B32B 2310/0843* (2013.01); *B32B 2367/00* (2013.01); *B32B 2369/00* (2013.01)

(56) References Cited

U.S. PATENT DOCUMENTS

2001/0008691 A1* 7/2001 Isogai .................. C09D 4/00
    522/95
2006/0024476 A1* 2/2006 Leland ................. B60R 13/02
    428/172
2010/0279043 A1* 11/2010 Hsu ..................... B05D 5/06
    428/35.7
2019/0029116 A1   1/2019 Carel
2020/0010660 A1* 1/2020 Higashikawa ............ C08J 5/18
2020/0346431 A1* 11/2020 Juenemann ............ B32B 27/36
2022/0333755 A1  10/2022 Sattler et al.

FOREIGN PATENT DOCUMENTS

| EP | 3815838 A1 | 5/2021 |
| EP | 3838612 A1 | 6/2021 |
| EP | 3647054 B1 | 7/2021 |
| EP | 2628638 B1 | 8/2021 |
| WO | 2021043397 A1 | 3/2021 |

OTHER PUBLICATIONS

Search Report in FR Patent Application No. 2112817 dated Aug. 8, 2022.

* cited by examiner

METHOD FOR MANUFACTURING A TRANSLUCENT OR TRANSPARENT VEHICLE PART

FIELD OF THE INVENTION

The invention relates to a motor vehicle part. More particularly, the invention relates to a method for manufacturing a transparent or translucent vehicle part and contributing to the external appearance of the vehicle and a vehicle part obtained by such a method.

BACKGROUND OF THE INVENTION

A vehicle comprises a plurality of transparent or translucent parts that are intended to transmit light. In particular, these are parts used for regulatory lighting purposes, for example those protecting the optical units of high and low headlamps or turn signals. Furthermore, the vehicle may also have light sources that are provided for decorative purposes and improve the esthetics of the vehicle.

For these purposes, it is possible to treat an external surface of the transparent or translucent parts in order to improve their appearance. One possibility for doing this consists in overmolding an opaque film, or mask, on the external surface of the part, the opaque film having a predefined pattern allowing the passage of light. In this way, when the light source that is associated with the part emits light, the light is partially blocked by the opacity of the opaque film and partially transmitted by the portions of the part that are opposite the pattern. This improves the esthetics of the light beam transmitted by the transparent or translucent part from the light source to the external environment. Another possibility is to decorate the part with paint and masking or with paint and laser etching, which allows a similar result to be obtained. Patent application EP3838612.A1, filed in the name of the applicant, discloses a method of manufacturing a vehicle part according to the preamble of claim 1.

These options are interesting, but have some drawbacks. Indeed, an opaque film such as that described above can cause problems of color mismatching with the paint of the vehicle, which has a negative impact on the esthetics of the vehicle. In addition, applying the opaque film in one of the ways presented above may not make it possible to obtain a pattern with as high a degree of precision as desired.

Another problem occurring with the opaque film of the prior art resides in the passage of light through the portions of the transparent or translucent part that are not covered by the pattern. Indeed, the light is transmitted freely through these portions, so that the elements located behind the part are visible from the outside if the light source associated with the part is switched off. This is mainly the light source and possibly some wiring elements. The visibility of these elements is not desired insofar as it harms the general esthetics of the vehicle, such that it is preferable to avoid it. And in some cases depending on the esthetic specifications, it may also be preferable to avoid the visibility of the transparent or translucent part itself.

The object of the invention is in particular to remedy these problems by proposing a method that does not pose a problem of color mismatching with the paint of the vehicle, that is more precise than that of the prior art and that allows the elements located behind the transparent or translucent part to be hidden.

SUMMARY OF THE INVENTION

To this end, according to the invention, a method for manufacturing a vehicle part is provided that comprises the following steps:
a1) applying a paint layer on a first face of a transparent or translucent part,
a2) applying a varnish layer on the paint layer,
a3) partially irradiating the paint layer and the varnish layer with laser radiation so as to etch the paint layer and the varnish layer, and
b) overmolding a semi-transparent film on a second face of the transparent or translucent part opposite the first face.

It is thus possible to apply the paint to the entire surface of the transparent or translucent part and then remove it by etching using laser radiation according to a predefined selected pattern. As will readily be understood, the laser makes it possible to remove the paint in order to obtain a more precise rendering than when implementing one of the methods of the prior art. In addition, the fact that the color of the coating is imparted by paint and not by a film as in the prior art makes it possible to select a paint that matches the one used for the vehicle body. It follows that no problem of color mismatching or shade harmony arises.

The semi-transparent film makes it possible to prevent seeing through the transparent or translucent part when the light source is switched off, without, however, preventing the transmission of the light emitted by the light source when it is on. It is thus understood that the elements located behind the transparent or translucent part are prevented from having an impact on the esthetics of the vehicle, since they are obscured by the semi-transparent film.

The overmolding of the semi-transparent film also reinforces the impact resistance of the vehicle part by acting as laminated safety glazing. This is particularly advantageous in the case where the vehicle part forms body panels, such as bumpers.

Given that the semi-transparent film is not deposited on the same face of the transparent or translucent part as the varnish and paint layers, the deposition operations on the first and second faces of the part can be carried out independently of one another, such that the method is simple to implement.

In addition, the semi-transparent film is deposited on the second face of the transparent or semi-transparent part that is intended to be oriented on the inside of the vehicle, that is to say, toward the light source. In other words, the semi-transparent film is sheltered from the external environment by the transparent or translucent part. Therefore, the constraints imposed on the semi-transparent film in terms of mechanical strength, for example resistance to pressurized water jets, scratching or chipping, are less critical than if the film were deposited on the first face of the transparent or translucent part.

"Paint layer" means that said layer may in particular comprise a primer and a colored base, a primer and a colored lacquer or even a colored lacquer alone.

Advantageously, the following step is implemented before step a1):
a0) applying a protective layer, comprising for example a varnish, on the first face of the transparent or translucent part, under the paint layer.

The arrangement of the different layers and the order in which they are applied overcomes the following technical difficulties:
in the case where it is made of polycarbonate, the transparent part is impossible to treat in order to protect it from ultraviolet radiation, which makes the presence of at least one varnish layer necessary.

it is very difficult to adhere a varnish layer directly to another varnish layer.

Advantageously, the transparent or translucent part is manufactured by molding a plastic such as polycarbonate, polypropylene, polyethylene terephthalate or poly(methyl methacrylate).

The transparent or translucent part is thus simple to produce and inexpensive.

Advantageously, the laser radiation has a wavelength in the infrared, preferably the near infrared, or the ultraviolet.

Such laser radiation effectively eliminates the paint layer and the varnish layer.

Advantageously, the varnish layer and the protective layer are made of a material that absorbs or reflects ultraviolet radiation.

In other words, the varnish layer and the protective layer do not allow the transmission of ultraviolet radiation. This protects the transparent or translucent part from ultraviolet radiation that might deteriorate it by photodegradation, since its entire outer surface is coated with the protective layer and, in part, with the varnish layer.

Advantageously, the paint layer comprises a primer undercoat.

The primer undercoat makes it possible to opacify the paint layer and thus improve its appearance. Without a primer undercoat, it would be necessary to increase the thickness of the paint layer in order to obtain a similar rendering, which it is preferable to avoid for reasons of appearance (sagging, color), cost, and adhesion of the paint layer to the transparent or translucent part. In addition, this improves the adhesion of the paint to the transparent or translucent part while making it possible for there to be a varnish layer in the regions without paint.

Advantageously, the vehicle part is polished after the irradiation step.

This improves the transparency of the vehicle part by limiting the edge effects of the irradiated regions. Specifically, the stepped shape of the layers coating the transparent or translucent part is reduced, which contributes to making its surface appearance more homogeneous.

Advantageously, the semi-transparent film has a visual effect chosen from the following list: chrome, metallic, shiny, matte, satin, brushed or copper, mirror effect.

This gives the semi-transparent film an esthetic luminous effect when it is illuminated by the light source, and makes it possible to effectively hide the elements behind the transparent or translucent part when the light source is switched off.

Advantageously, the semi-transparent film comprises a stack of layers made of polyethylene terephthalate.

This type of structure allows the semi-transparent film to have a chrome appearance with simple and inexpensive means.

Advantageously, the semi-transparent film has a thickness of between 100 µm and 1 mm.

This range of thickness provides a good compromise between the transmission of the light emitted by the light source, the concealment of the elements behind the transparent or translucent part when the light source is switched off, the mechanical strength of the film and its manufacturing cost.

Advantageously, the transparent or translucent part has, on its first face, at least one main shape in relief.

This makes it possible to create a particular luminous effect owing to the light scattering in the main shape in relief. This luminous effect is further amplified by the presence of the semi-transparent film. Moreover, compared to a configuration in which the semi-transparent film would be deposited on the first face of the transparent or translucent part, the luminous effect obtained is further amplified and makes it possible to provide a particularly esthetic three-dimensional depth effect, especially if the transparent or translucent part is colored.

Preferably, the laser irradiation of step a3) is carried out at least opposite the at least one main shape in relief.

In this way, the pattern created in the paint layer by laser irradiation coincides with the region of the transparent or translucent part comprising the at least one main shape in relief. This also makes it possible to avoid obtaining a so-called "sticker" effect according to which the difference in level between the regions of the pattern and the regions outside the pattern can be felt by sliding a finger or a fingernail, which provides a certain rather unpleasant effect and connotes a lower quality of the vehicle part.

Preferably, the second face has at least one secondary shape in relief opposite the main shape in relief and of opposite convexity.

This increases the field of application of the light effects that can be generated by the shapes in relief in combination with the semi-transparent film, which makes it possible to greatly improve the esthetics of the vehicle part. In addition, the transparent or translucent part thus has a uniform thickness, which makes it possible to improve the quality of the step of molding the part by avoiding the formation of appearance defects.

According to the invention, a vehicle part is also provided that is obtained through implementation of a manufacturing method as defined above. In other words, provision is also made according to the invention for a vehicle part comprising:

a transparent or translucent part having a first face and a second face opposite the first face, a paint layer applied to the first face, a varnish layer applied to the paint layer, the paint layer and the varnish layer being engraved according to the same predetermined pattern, and a semi-transparent film overmolded on the second face of the transparent or translucent part.

Advantageously, the semi-transparent film has a visual effect chosen from the following list: chrome, metallic, shiny, matte, satin, brushed or copper, mirror effect.

Advantageously, the semi-transparent film comprises a stack of layers made of polyethylene terephthalate.

Advantageously, the semi-transparent film has a thickness of between 100 µm and 1 mm.

BRIEF DESCRIPTION OF THE FIGURES

The invention will be better understood upon reading the description which follows, given solely by way of example and with reference to the appended drawings in which.

DETAILED DESCRIPTION

Figure 1:
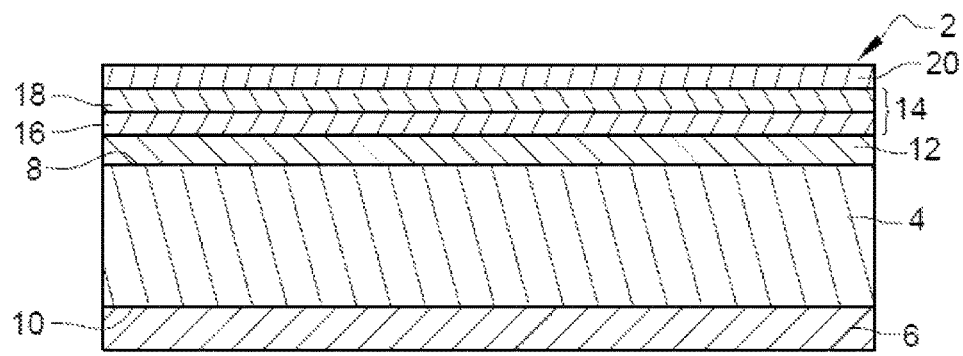
FIG. 1 is a sectional view of a first step in the implementation of a method for manufacturing a vehicle part according to a first embodiment of the invention.

FIG. 1 shows a first step of a method for manufacturing a vehicle part 2 according to a first embodiment of the invention.

The vehicle part 2 comprises a transparent or translucent part 4 that is intended to protect a light source (not shown). The term "transparent," "translucent," respectively, is understood to mean that it is at least transparent to any light radiation having a wavelength within the visible spectrum, i.e., between approximately 380 and 780 nm. The transparent part 4 is made here of a plastic having this characteristic—in this case polycarbonate, commonly called "PC." However, a provision can be made to produce the part from any other plastic, such as polypropylene (PP) (translucent), polyethylene terephthalate (PET) (translucent) or poly(methyl methacrylate) (PMMA) (transparent). The transparent or translucent part 4 is made by molding. Since such a method is known, we will not go into further detail about it in the following.

The vehicle part 2 comprises a semi-transparent film 6 that is overmolded on the transparent part 4. The transparent part 4 has a first face 8 that forms the external surface of the transparent part 4. The term "external surface" is understood to mean a surface of the transparent part 4 that is not situated opposite the light source and that is intended to be exposed to the external environment once the vehicle has been manufactured. The transparent part 4 further has a second face 10, forming the internal surface of the transparent part 4, opposite the first face 8. In other words, the light emitted by the light source first encounters the second face 10, then the first face 8, before entering the external environment. The semi-transparent film 6 here is overmolded on the second face 10 of the transparent part 4.

The semi-transparent film 6 is defined as such in that it allows the transmission of the light emitted by the light source, with possible partial absorption of this light, but prevents the transmission of natural light. Here, the semi-transparent film 6 comprises a stack of layers made of polyethylene terephthalate (PET) such that the semi-transparent film 6 has a thickness of between 100 μm and 1 mm. This stack of layers makes it possible to give the semi-transparent film 6 a chrome appearance, but it is possible to replace the stack of layers made of polyethylene terephthalate with a completely different stack to give another appearance to the semi-transparent film. For example, it is possible to choose the constitution of the semi-transparent film so that it has a visual effect chosen from the following list: chrome, metallic, shiny, matte, satin, brushed or copper, mirror effect. The semi-transparent film 6 has a simple shape, devoid of openings, covering the entirety of the second face 10 or at the very least a portion of it. It will be seen below how these properties of the semi-transparent film 6 are of interest in the context of the invention.

The vehicle part 2 here comprises a protective layer 12 that is deposited on the first face 8 of the transparent part 4. The protective layer 12 here comprises a varnish layer and protects the transparent part 4 from any ultraviolet radiation to which it may be exposed, particularly from the sun. In addition, the protective layer 12 makes it possible to mechanically protect the transparent part 4, particularly to prevent it from being scratched or deformed by external stresses. In absolute terms, the presence of the protective layer 12 is optional. The protective layer 12 is transparent to any light radiation having a wavelength in the visible spectrum, so as not to prevent the transmission of the light emitted by the light source through the vehicle part 2.

The vehicle part 2 comprises a paint layer 14 that is deposited over the protective layer 12. Here, the paint layer 14 comprises a primer undercoat 16 onto which a base layer 18 is deposited. The base layer 18 makes it possible to color the external appearance of the vehicle part 2. The primer undercoat 16 improves the opacity of the paint layer 14 and improves the adhesion of the base layer 18 to the transparent part 4.

The vehicle part 2 comprises a varnish layer 20 that is deposited over the paint layer 14. The varnish layer 20 makes it possible to protect the transparent part 4 and the paint layer 14 from any ultraviolet radiation to which they may be exposed. Here, the protective layer 12 and varnish layer 20 are made of the same material, but a provision can be made to use two different varnishes to produce the two layers 12, 20.

To deposit the semi-transparent film 6 and the different layers on the transparent part 4, the following steps shown in FIG. 1 are implemented:

a0) applying the protective layer 12 on the first face 8 of the transparent part 4,
a1) applying the paint layer 14 on the protective layer 12,
a2) applying the varnish layer 20 on the paint layer 14, and
b) overmolding the semi-transparent film 6 on the second face 10 of the transparent part 4.

Among the steps listed above, steps a0), a1) and a2) are carried out successively. Step b) is carried out independently of the prior implementation of steps a0), a1) and a2), although it is generally carried out before implementing steps a0), a1) and a2).

Figure 2:
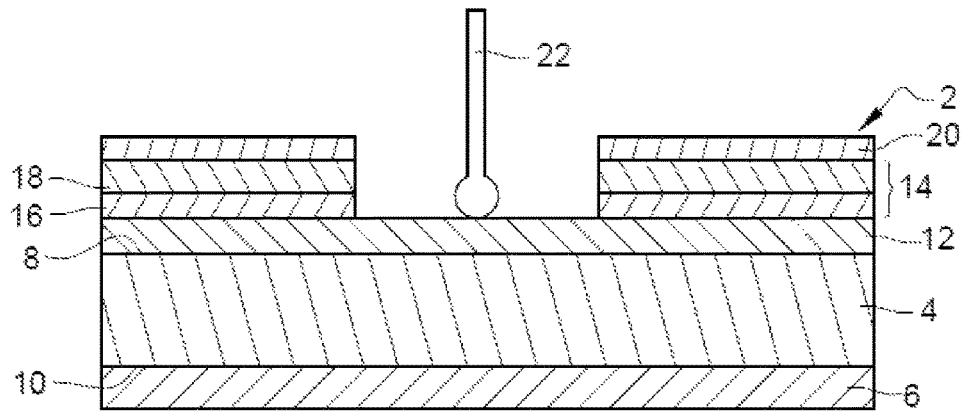
FIG. 2 is a sectional view of a second step in the implementation of a method for manufacturing the vehicle part according to the first embodiment of the invention.

FIG. 2 shows a following step of the method for manufacturing the vehicle part 2. In this step a3), a portion of the vehicle part 2 is irradiated using laser radiation 22 so as to etch the paint layer 14 and the varnish layer 20. This etching is carried out throughout the thickness of the paint layer 14 and the varnish layer 20. This operation is commonly referred to as "laser-etching." In the context of the invention, the laser radiation 22 has a wavelength in the infrared, i.e., between 700 nm and 20,000 nm. One example of such laser radiation is that commonly referred to as "$CO_2$ laser," which has a wavelength of 10,600 nm. Preferably, the wavelength of the laser radiation 22 is in the near infrared, i.e., between 700 and 2,000 nm. In this case—and if the protective layer 12 and the varnish layer 20 are transparent to laser radiation 22—the latter range has the advantage of not etching said layers. This avoids the risk of damaging said layers, in particular the protective layer. Alternatively, provision can be made for the laser radiation to have a wavelength in the ultraviolet.

The irradiation is carried out in only a portion of the vehicle part 2 in the sense that it is carried out according to a predefined pattern of the external surface of the varnish layer 20. It is controlled in such a way that the varnish layer 20 and the paint layer 14 are irradiated and hence eliminated in the pattern and throughout their thickness, but not the protective layer 12, which protects the transparent part 4 from ultraviolet radiation in the regions of the pattern that have been etched. Even if the varnish layer 20 is made of a material that is transparent to laser radiation 22, the irradiation of the underlying paint layer 14 makes it possible to eliminate the varnish layer 20 in the pattern.

After irradiation, the surface of the vehicle part 2 has two levels.

In the region of the predefined pattern, the first face 8 of the transparent part 4 is coated only with the protective layer 12. In this region, the light emitted by the light source can be transmitted from the light source to the external environment, but in the other direction the semi-transparent film limits the transmission of natural light to the light source. In this way, the light source and any wiring it may have are not visible from outside the vehicle when the light source is switched off.

Outside the region of the predefined pattern, the first face 8 of the transparent part 4 is coated with the protective layer 12, the paint layer 14 and the varnish layer 20. In this region, visible light cannot be transmitted from the external environment to the transparent part 4, and vice versa, because it is absorbed by the paint layer 14. In particular, the protection of the transparent part 4 from ultraviolet radiation to which it may be exposed is ensured by the varnish layer 20.

After this irradiation step, an additional step of polishing the vehicle part 2 can be provided. This improves transparency in the region of the predefined pattern and, more generally, the esthetics of the vehicle part 2. In addition, this polishing makes it possible to round the corners formed by the etching carried out during the irradiation step, and thus to improve the esthetics of the vehicle part 2 and its tactile surface quality.

It is possible to implement a variant embodiment in which steps a2) and a3) are inverted, so that the varnish layer is not etched by the laser irradiation. It is also possible to implement another alternative embodiment of the method according to which a step a4) is added occurring after step a3) consisting in applying an additional varnish layer over the paint layer and the varnish layer that have been etched by laser irradiation.

Figure 3:
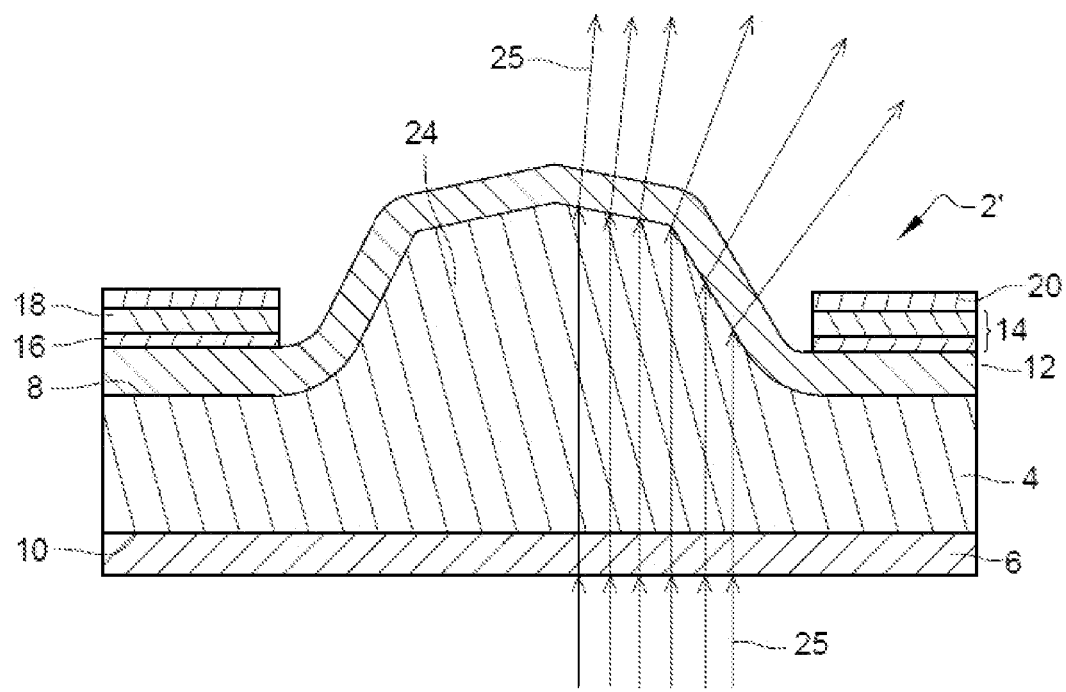
FIG. 3 is a sectional view of a vehicle part resulting from the implementation of a manufacturing method according to a second embodiment of the invention.

FIG. 3 shows a vehicle part 2' obtained by implementing a manufacturing method according to a second embodiment of the invention. Only the differences presented by the vehicle part 2' compared to that of the first embodiment will be described in the following. Identical or similar elements from one embodiment to another bear identical reference numerals.

The vehicle part 2' comprises a transparent part 4 having, on its first face 8, at least one so-called main relief shape 24 under the protective layer 12. In the example of FIG. 3, it is in the form of a rounded convex bump, but it can take any desired shape, and in the desired number. Apart from the at least one main shape in relief 24, the first face 8 has a flat or curved shape. It is assumed in what follows that the transparent part 4 comprises several main shapes in relief 24, knowing that it could very well comprise a single main shape in relief.

The semi-transparent film 6, the protective layer 12, the varnish layer 20 and the paint layer 14 are deposited and etched in the same way as in the previous embodiment of the invention, by implementing steps a0) to a3) and b). Preferably, the laser irradiation of step a3) is carried out at least opposite the main shapes in relief 24. Thus, the pattern generated in the paint layer 14 and in the varnish layer 20 coincides with the main shapes in relief 24 of the transparent part 4. In this way, the light emitted by the light source passes into the pattern through the semi-transparent film 6, the main shapes in relief 24 and the protective layer 12, which makes it possible to generate a particularly esthetic light scattering, in particular for a person who is not directly in front of the vehicle part but who observes it from the side. This light scattering is illustrated in FIG. 3 by light rays 25 emitted from the light source that are refracted as they exit the main shapes in relief 24, thereby creating a prismatic light scattering effect.

Figure 4:
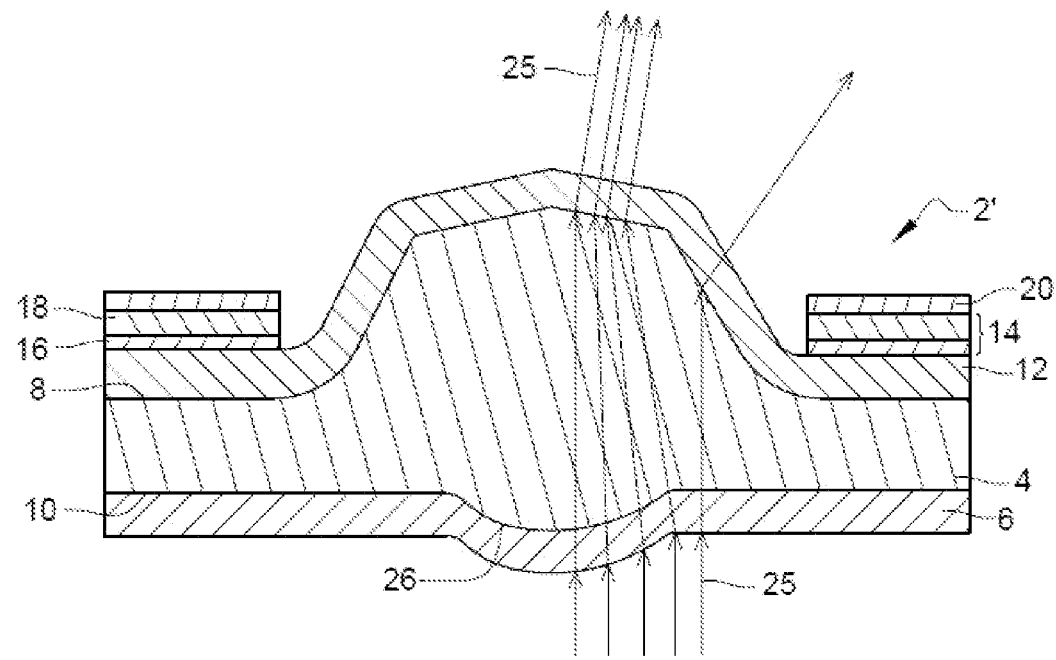
FIG. 4 is a sectional view of a vehicle part resulting from the implementation of a manufacturing method according to a variant of the second embodiment of the invention.

FIG. 4 shows a vehicle part 2' according to a variant of the second embodiment illustrated in FIG. 3. It differs therefrom in that the transparent part 4 has, on its second face 10, at least one so-called secondary shape in relief 26 located opposite a main shape in relief 24 considering a direction of thickness of the transparent part 4 that is vertical in FIG. 4. The secondary shape in relief 26 has a similar convexity with respect to the main shape in relief 24 that is opposite it. In the example of FIG. 4, the vehicle part 2' comprises a main shape in relief 24 that is convex and a secondary shape in relief 26 that is also convex.

The arrangement of the main 24 and secondary 26 shapes in relief makes it possible to obtain a light distribution at the first face 8 of the transparent part 4 that is different from the one obtained with the vehicle part of FIG. 3. Through the convexity of the main 24 and secondary 26 shapes in relief, one obtains local concentrations of the light rays passing through the part 4 due to the refraction of the light rays 25 at the second face 10 then at the first face 8, thus creating a certain esthetic effect.

Figure 5:
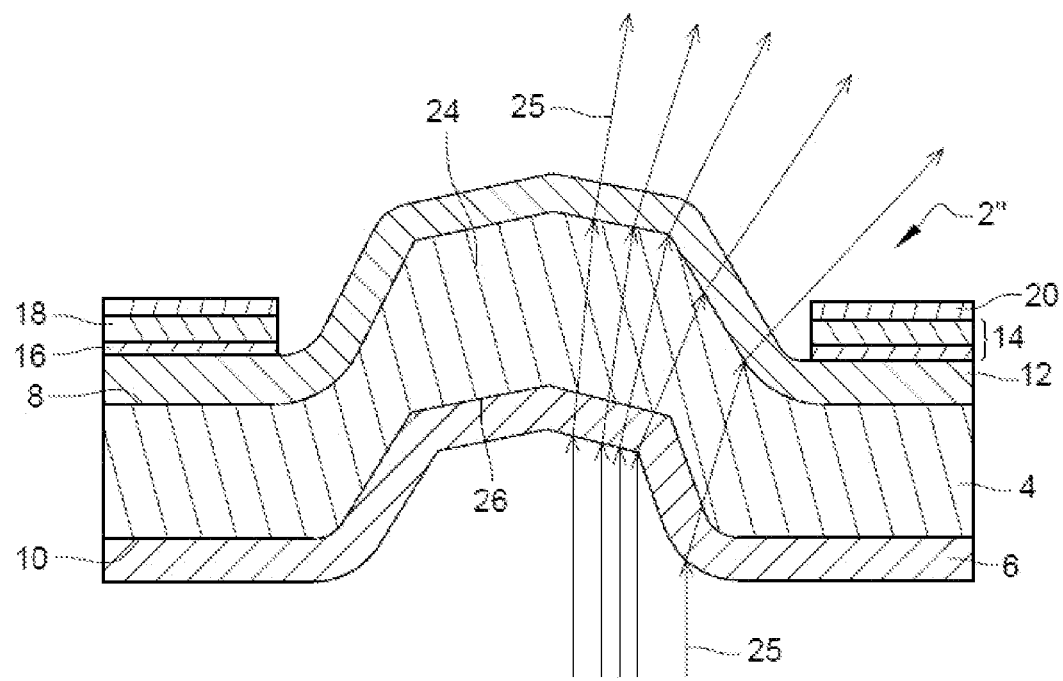
FIG. 5 is a sectional view of a vehicle part resulting from the implementation of a manufacturing method according to a third embodiment of the invention.

FIG. 5 shows a vehicle part 2" obtained by implementing a manufacturing method according to a third embodiment of the invention. Only the differences presented by the vehicle part 2" compared to that of FIG. 3 will be described in the following. Identical or similar elements from one embodiment to another bear identical reference numerals.

The vehicle part 2" comprises a transparent part 4 having, on its second face 10, at least one so-called secondary shape in relief 26. Here, the transparent part 4 comprises as many secondary shapes in relief 26 as it comprises main shapes in relief 24. Each secondary shape in relief 26 is located opposite a main shape in relief 24 considering a direction of thickness of the transparent part that is vertical in FIG. 4, so that the set of secondary shapes in relief 26 is the image of the set of main shapes in relief 24 by a one-to-one function. Each secondary shape in relief 26 has an opposite convexity, but an identical shape and identical dimensions, with respect to the main shape in relief 24 that is opposite it. In the example of FIG. 5, the vehicle part 2" comprises a convex main shape in relief 24 and a concave secondary shape in relief 26, of identical shape and dimensions so that two vehicle parts 2" could be fitted together one into the other. In other words, the transparent part 4 has a uniform thickness. As in the previous figure, the light rays 25 illustrate the light scattering passing through the vehicle part 2". The light rays 25 here are refracted twice and in the same direction, namely when they pass through the secondary shape in relief 26 and then when they pass through the main shape in relief 24.

The semi-transparent film 6, the protective layer 12, the varnish layer 20 and the paint layer 14 are deposited and etched in the same way as in the previous embodiments of the invention, by implementing steps a0) to a3) and b) and performing the laser irradiation of step a3) at least opposite the main shapes in relief.

Figure 6:
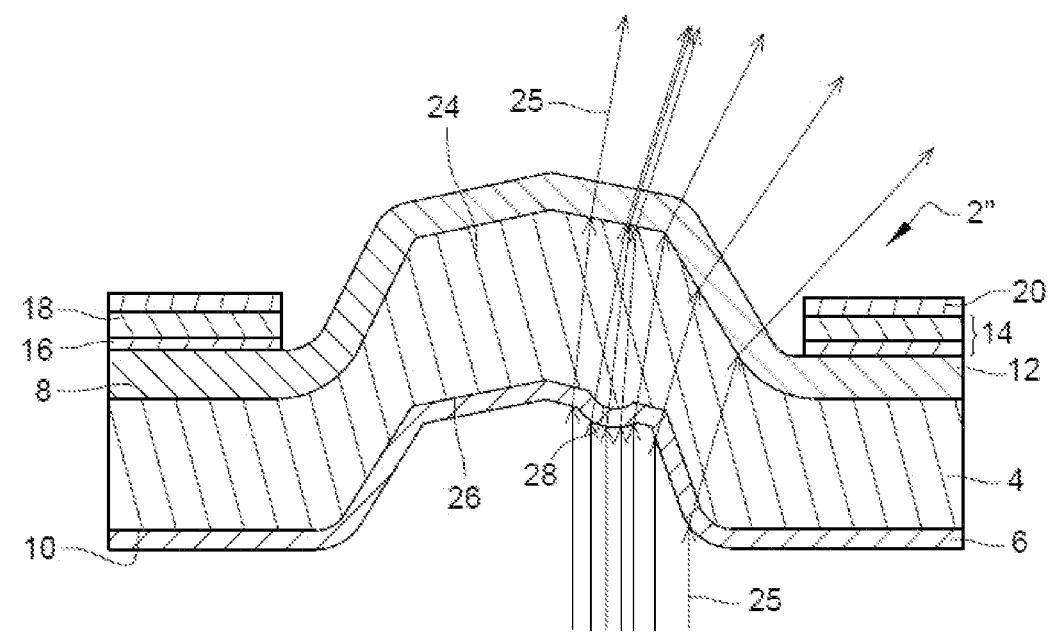
FIG. 6 is a sectional view of a vehicle part resulting from the implementation of a manufacturing method according to a variant of the third embodiment of the invention.

FIG. 6 shows a vehicle part 2" according to a variant of the third embodiment illustrated in FIG. 5. It differs therefrom in that inside the secondary shape in relief 26, the second face 10 of the transparent part 4 comprises at least one so-called optical relief 28 configured to further alter the trajectory of some of the light rays 25 passing through the transparent part 4. The optical relief 28 here is in the form of a convex relief, generating a strong local concentration of the light rays leaving the vehicle part 2" through the first face 8. However, any possible shape can be provided for the optical relief. By way of example, the shape of the optical relief may be such that it forms a collimator, a concave prism or a convex prism.

The invention is not limited to the embodiments described here, and other embodiments will become clearly apparent to a person skilled in the art.

To produce the pattern, the laser irradiation engraving technique can be replaced by concealing or masking techniques if the degree of precision of these techniques is satisfactory when implementing the invention. It is also possible to provide for the use of concealing or masking and then implementing engraving by laser irradiation in order to make the production of the pattern more precise.

The light source can be part of an optical unit of low and high beams of the vehicle, of an optical unit of turn signals of the vehicle, or of an optical unit of decorative lights.

Alternatively, the transparent part can incorporate light guides or light sources without an optical unit through insert molding, overmolding, fixing by gluing, welding, riveting, or by any other fixing means.

LIST OF REFERENCES

2; 2'; 2": vehicle part
4: transparent or translucent part
6: semi-transparent film
8: first face
10: second face
12: protective layer
14: paint layer
16: primer undercoat
18: base layer
20: varnish layer
22: laser radiation
24: main shape in relief
25: light ray
26: secondary shape in relief
28: optical relief

The invention claimed is:

1. A method for manufacturing a vehicle part that emits light, comprising the following steps:
   a1) applying a paint layer on a first face of a transparent or translucent part,
   a2) applying a transparent varnish layer on the paint layer, and
   a3) partially irradiating the paint layer and the varnish layer with laser radiation so as to etch the paint layer and the varnish layer, and
   b) overmolding a semi-transparent film on a second face of the transparent or translucent part opposite the first face, the semi-transparent film configured for preventing transmission of natural light to a light source behind the transparent or translucent part such that the light source is not visible from outside the vehicle part when the light source is switched off.

2. The method according to claim 1, wherein the following step is implemented before step a1):
   a0) applying a protective layer on the first face of the transparent or translucent part, under the paint layer.

3. The method according to claim 1, wherein the transparent or translucent part is manufactured by molding a plastic.

4. The method according to claim 3, wherein the plastic is polycarbonate, polypropylene, polyethylene terephthalate or poly(methyl methacrylate).

5. The method according to claim 1, wherein the laser radiation has a wavelength in the infrared or the ultraviolet.

6. The method according to claim 1, wherein the laser radiation has a wavelength in the near infrared.

7. The method according to claim 1, wherein the semi-transparent film has a visual effect chosen from the following list: chrome, metallic, shiny, matte, satin, brushed or copper, mirror effect.

8. The method according to claim 1, wherein the semi-transparent film comprises a stack of layers made of polyethylene terephthalate.

9. The method according to claim 1, wherein the semi-transparent film has a thickness of between 100 μm and 1 mm.

10. The method according to claim 1, wherein the transparent or translucent part has, on its first face, at least one main shape in relief.

11. The method according to claim 10, wherein the laser irradiation of step a3) is carried out at least opposite the at least one main shape in relief.

12. The method according to claim 10, wherein the second face has at least one secondary shape in relief opposite the main shape in relief and of opposite convexity.

13. The method according to claim 1, wherein the varnish layer is transparent to any light radiation having a wavelength in the visible spectrum.

14. The method according to claim 1, wherein the semi-transparent film permits transmission of at least a portion of emitted light.

* * * * *